US012153203B2

(12) United States Patent
Burnsed et al.

(10) Patent No.: US 12,153,203 B2
(45) Date of Patent: Nov. 26, 2024

(54) APPARATUS AND METHOD FOR A VISION SYSTEM HAVING A TRANSPARENT DISPLAY AND A DIFFRACTIVE, PLANAR LENS

(71) Applicant: L3Harris Technologies, Inc., Melbourne, FL (US)

(72) Inventors: Jon D. Burnsed, Tempe, AZ (US); Jacob J. Becker, Gilbert, AZ (US)

(73) Assignee: L3Harris Technologies, Inc., Melbourne, FL (US)

( * ) Notice: Subject to any disclaimer, the term of this patent is extended or adjusted under 35 U.S.C. 154(b) by 322 days.

(21) Appl. No.: 17/514,905

(22) Filed: Oct. 29, 2021

(65) Prior Publication Data
US 2023/0133988 A1     May 4, 2023

(51) Int. Cl.
| | |
|---|---|
| *G02B 23/12* | (2006.01) |
| *G02B 3/08* | (2006.01) |
| *G02B 13/16* | (2006.01) |

(52) U.S. Cl.
CPC ............. *G02B 23/12* (2013.01); *G02B 3/08* (2013.01); *G02B 13/16* (2013.01)

(58) Field of Classification Search
CPC .......... G02B 23/12; G02B 3/08; G02B 13/16
USPC ...................................................... 359/400
See application file for complete search history.

(56) References Cited

U.S. PATENT DOCUMENTS

| | | | |
|---|---|---|---|
| 9,097,891 B2 | 8/2015 | Border et al. | |
| 2011/0228181 A1* | 9/2011 | Jeong | H04N 13/356 359/463 |
| 2013/0342473 A1* | 12/2013 | Sultenfuss | G06F 3/0393 345/173 |
| 2013/0342474 A1 | 12/2013 | Sultenfuss et al. | |

(Continued)

FOREIGN PATENT DOCUMENTS

| | | |
|---|---|---|
| WO | 2004/002143 | 12/2003 |
| WO | 2007/049213 | 5/2007 |

(Continued)

OTHER PUBLICATIONS

U.S. Appl. No. 16/868,306 Dated May 6, 2020.

(Continued)

*Primary Examiner* — Sharrief I Broome
(74) *Attorney, Agent, or Firm* — Workman Nydegger

(57) ABSTRACT

An apparatus and method are provided for a night vision system including a transparent overlay display that transmit direct-view light representing an intensified image and emits display light representing a display image. The night vision system includes an intensifier with a flat exit face, an overlay display that is flat/planar, and planar, diffractive lens. The direct-view light and the display light exit the overlay display with the same phase curvature (e.g., a flat phase curvature). The planar, diffractive lens induces a spherical phase curvature on the light exiting the overlay display. The phase curvature induced by the planar, diffractive lens matches the phase curvature of a legacy intensifier in which the final element is fiberoptic inverting element with a (Continued)

curved exit face. Accordingly, the combination of the intensifier, overlay display, and planar, diffractive lens can replace the legacy intensifier while maintaining the design specifications of the night vision system.

9 Claims, 11 Drawing Sheets

(56) References Cited

U.S. PATENT DOCUMENTS

| | | | |
|---|---|---|---|
| 2014/0267961 A1* | 9/2014 | Jeong | G02B 5/1876 349/147 |
| 2017/0047020 A1* | 2/2017 | Yata | G09G 3/3413 |
| 2018/0182174 A1* | 6/2018 | Choi | G02B 27/0075 |
| 2019/0164733 A1 | 5/2019 | Burnsed et al. | |
| 2019/0212479 A1* | 7/2019 | Iazikov | G02B 5/3083 |
| 2020/0209708 A1* | 7/2020 | Neshev | G02F 1/3534 |
| 2020/0259307 A1* | 8/2020 | Sharma | H01S 5/3432 |
| 2020/0271583 A1* | 8/2020 | Ortiz Egea | G01J 3/12 |
| 2020/0301147 A1* | 9/2020 | Klug | G02B 25/001 |
| 2021/0028215 A1* | 1/2021 | Devlin | G02B 27/4244 |
| 2021/0400944 A1 | 12/2021 | Burnsed et al. | |

FOREIGN PATENT DOCUMENTS

| | | | | |
|---|---|---|---|---|
| WO | WO-2012040087 A1 * | 3/2012 | | B23Q 5/40 |
| WO | WO-2018017177 A2 * | 1/2018 | | G02B 23/12 |
| WO | 2018/142339 A1 | 8/2018 | | |

OTHER PUBLICATIONS

European Search Report received for EP Patent Application No. 22203213.8, mailed on Mar. 20, 2023, 8 pages.

Lee et al., "Metasurface eyepiece for augmented reality", Nature Communications, vol. 9, Nov. 2018, pp. 30.

* cited by examiner

APPARATUS AND METHOD FOR A VISION SYSTEM HAVING A TRANSPARENT DISPLAY AND A DIFFRACTIVE, PLANAR LENS

BACKGROUND

Night vision (NV) systems allow users to see in low-light environments without flooding the environment with visible light. Accordingly, NV systems can be used for covert vision in low-light environments. By enabling sight without illumination in the visible or other spectra, NV systems protect users from being detected.

Analog NV systems function by receiving low levels of light and intensifying the received light using an image intensifier. The image intensifier has a photocathode that emits electrons in response to incident photons. The emitted electrons are accelerated through a vacuum tube and directed towards a microchannel plate that amplifies the signal by multiplying the number of electrons. The multiplied electrons then strike a phosphor screen, and, via the phenomenon of luminescence, the phosphor screen emits photons in response to radiant energy (e.g., the electrons). The luminescent light from the phosphor screen is coupled through a series of optics to the user. For example, the luminescent light may be coupled through an inverting fiber optic to an eyepiece where the user can view the illuminated phosphor screen, thus allowing the user to see the objects.

Analog NV systems can include an overlay display that transmits a direct-view, intensified image through the overlay display and emits display light representing a display image from the overlay display to thereby generate a combined image with the display image superimposed over the direct-view, intensified image. The Overlay display can be used to convey various information to the user, such as temperatures, distances, indicators marking objects, situational awareness messages, messages from other users, etc.

Analog NV systems, however, are not optimized for use with an overlay display, which presents challenges if the intensifier module from a legacy analog NV system is being upgraded to an intensifier module that includes an overlay display. For example, many legacy systems use an intensifier module having a curved exit surface to reduce the number of lens elements in an eyepiece. Such a configuration is beneficial because it reduces the weight of the legacy system and thereby reduces the torque on the user's neck, among other advantages. The curved exit surface poses a challenge for adding an overlay display because fabrication on a curved surface is difficult (e.g., semiconductor fabrication processes are typically performed on flat, planar surfaces, which are advantageous for photolithography).

Other solutions attempt to address the curved exit surface problem by introducing additional optical elements (e.g., one or more additional lenses) that would allow the overlay display to be fabricated on a flat surface. However, these additional optical elements must be squeezed into the limited space allotted for the intensifier module. In legacy systems, the space allotted for the intensifier module is already severely constrained, and shortening the intensifier module to accommodate both the overlay display and the additional optical element(s) presents a significant design challenge for the intensifier module. Accordingly, an improved configuration of an intensifier module with overlay display is desired for backwards compatibility with legacy analog NV systems.

Independently of making intensifier modules backwards compatible with legacy systems, the improved configuration of the intensifier module can be advantageous in its own right. For example, the improved configuration may have reduced mass and a reduced moment of inertia relative to prior intensifier module configurations. Reducing the moment of inertia results in less torque on a user's neck, which reduces neck strain and fatigue.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes an optical device that includes a semiconductor chip having a first surface that receives direct-view light and transmits the direct-view light through the transparent regions of the optical device. The optical device further includes a plurality of electro-optical circuits formed on the semiconductor chip. The plurality of electro-optical circuits includes light emitters configured to output display light, and the transparent regions being arranged between respective light emitters of the light emitters. The plurality of electro-optical circuits also includes a planar, diffractive lens arranged to induce a phase curvature on the display light and to induce a same phase curvature on the direct-view light as on the display light.

Another embodiment illustrated herein is a method of processing light in an intensifier module. The method includes receiving, at an intensifier, light from an environment and generating intensified light representing an intensified image of the environment, the intensified light having a first phase curvature upon exiting the intensifier. The method further includes transmitting the intensified light through a transparent overlay display, and emitting display light from the transparent overlay display to superimpose a display image over the intensified image, the display light having a second phase curvature that matches the first phase curvature of the intensified light. The method further includes inducing, using a planar, diffractive lens, a third phase curvature on the display light and the intensified light transmitting the luminescent light within the first range of wavelengths through the one or more detectors. The method further includes transmitting the display light and the intensified light with the third phase curvature to an eye piece comprising lenses.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
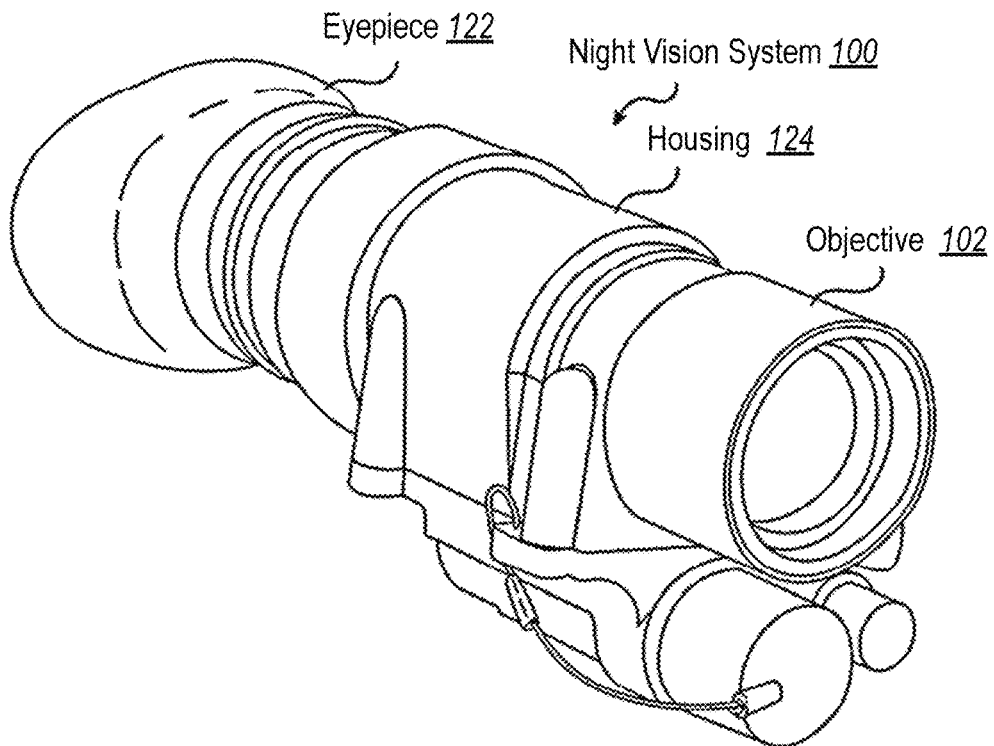
FIG. 1A illustrates a perspective view of a night vision (NV) system, according to one embodiment.

As discussed above, an analog night vision (NV) system can include both an intensified image and an overlay image, such as the image from an overlay/heads-up display. This combined image can be generated using an intensifier module having an integrated overlay display. Legacy analog NV systems can be provided with intensifier modules that do not include the overlay display functionality, and, therefore, it would be advantageous to upgrade these legacy NV systems by replacing the legacy intensifier modules with a higher-functionality intensifier module that does include the overlay display functionality. For example, in a legacy system that has an intensifier module without an overlay display, the legacy intensifier module may be removed and replaced with an intensifier module having an integrated overlay display to provide the improved functionality of displaying information (e.g., text, pictograms, or other symbolic information) using an overlay display.

However, a challenge for such a replacement is that the intensifier module in the legacy system may have a curved exit surface. That is, the intensified image exiting the intensifier module may have a curved focal plane (e.g., a curved phase front of the exiting light). Having a curved focal plane at the exit of the intensifier module is advantageous because so doing may reduce the number of lens elements in the eyepiece of the analog NV system. For example, the last optical element in the legacy intensifier module may be a fiberoptic inverting element. By grinding and polishing the exit surface of the fiberoptic inverting element this element acts as a lens, causing a phase curvature of the exiting light thereby reducing by one the number of lenses in the eyepiece of the analog NV system.

Although it is straightforward to fabricate a curved surface on a fiberoptic inverting element, fabricating an overlay display on a curved surface presents several challenges. Accordingly, the overlay display that is integrated with an intensifier module will typically be flat or planar. For example, the overlay display may be fabricated using a crystalline based circuit (e.g., a circuit fabricated on a single crystal silicon wafer) for driving the respective pixels of the overlay display. The lithographic processes used to fabricate the driving circuit and the overlay display are less challenging on a non-curved substrate. Additionally, the overlay display may be flat because it is fabricated using a flat cover glass.

Combining a flat overlay display with an intensifier module having a curved exit surface is not desirable because the display image generated by the overlay display will have a different focal point than the intensified image generated by the intensifier module. For example, the intensified light from the intensifier module (e.g., from the curved exit surface of the fiberoptic inverting element) will have a different phase curvature than the display light generated by the flat overlay display. Thus, if the eyepiece is optimized/focused to make the intensified image clear, the display image will be out of focus. Alternatively, if the display image is in focus, the intensified image will be out of focus.

Several approaches may be used to enable the integration of a flat overlay display with an intensifier module. First, the fiberoptic inverting element can be fabricated with a flat, rather than curved, exit face. Thus, the phase curvature will be flat both for the intensified light exiting the fiberoptic inverting element and for the display light emitted from the overlay display. Because the phase curvature is the same for both the intensified light and the display light, the same setting for the eye piece of the NV system will cause both the intensified light and the display light to be in focus.

However, if the eye piece of the NV system is specified to work for incoming light having a non-flat phase curvature, then the light exiting the overlay display can pass through an optical element (e.g., a lens) before entering the eyepiece, and this optical element/lens can apply the specified non-flat phase curvature. That is, the specified non-flat phase curvature can be imposed on the combination of the intensified light and the display light, after the combined light exits the overlay display and before the combined light enters the eye piece. For example, a refractive lens may be arranged between the overlay display and the eyepiece. Alternatively, a planar optical element (e.g., a diffractive lens, such as a metamaterial diffractive lens) is arranged between the overlay display and the eyepiece to provide the specified focal plane curvature.

Alternatively, the eyepiece can be modified to accommodate the combined light entering the eyepiece having a flat phase curvature. For example, a refractive lens may be added to the entrance of the eyepiece.

Returning to the above solution of arranging a planar optical element in the intensifier module after the overlay display, there are several advantages of using a planar optical element, as opposed to a refractive lens. First, the planar optical element can be very thin, and therefore does not adversely affect the diopter range of the eye piece. Second, because the planar optical element can be thin, it does not consume the space needed for other elements in the intensifier module. Third, the planar optical element is flat like the overlay display, making it straightforward to integrate the planar optical element with the overlay display. Additionally, the planar optical element may have little mass, thereby reducing the torque on a user's neck. Fourth, by imposing the desired focal plane curvature within the volume allotted for an intensifier module, the planar optical element makes the integrated intensifier module backward compatible with legacy analog NV systems that are designed to have a curved focal plane for light exiting the intensifier module. Indeed, in some embodiments, an NV system can be upgraded by removing the legacy intensifier module and replacing it with an integrated intensifier module.

Figure 1B:
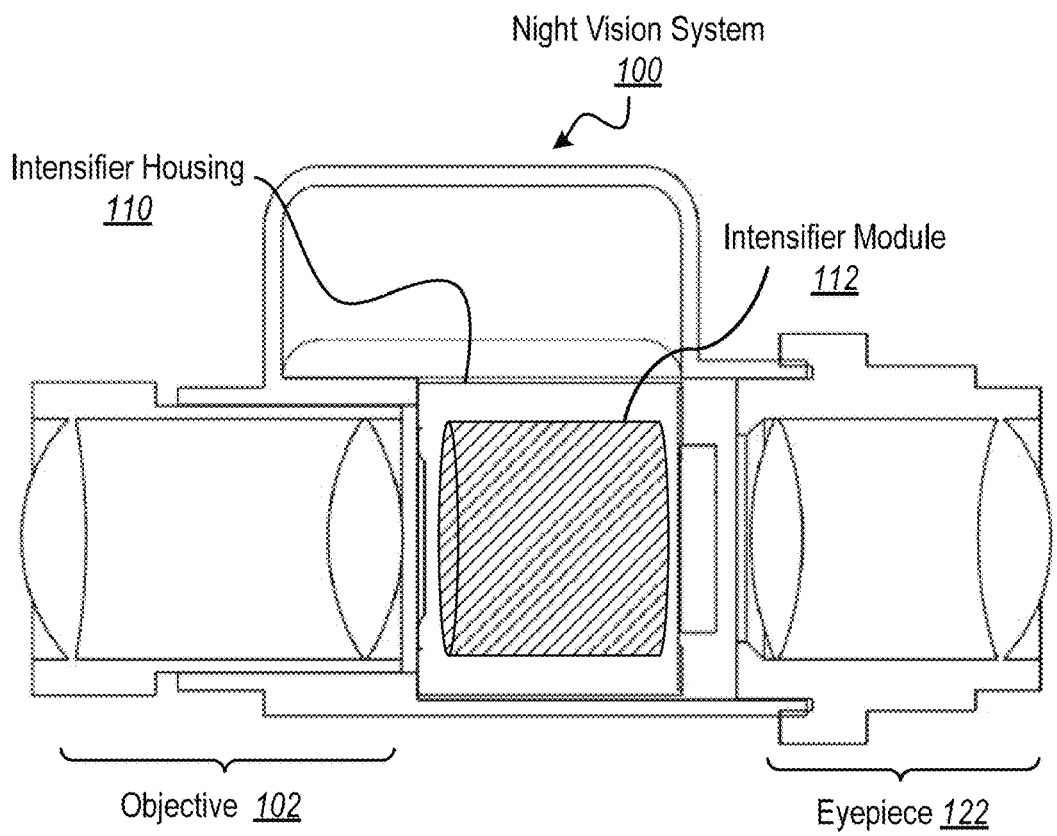
FIG. 1B illustrates a side cutaway view of the NV system, according to one embodiment.

Referring now to FIGS. 1A and 1B, a non-limiting example of a NV system is illustrated. In particular, FIGS. 1A and 1B illustrate a PVS— 14 NV system 100. In the example illustrated, the NV system 100 includes a housing 124. As will be illustrated in more detail below in other figures, the housing 124 houses an image intensifier module 112 in an intensifier housing 110. The NV system 100 further includes an objective 102 which receives light reflected and/or generated in an environment. The objective 102 includes optics such as lenses, waveguides, and/or other optical components for receiving and transmitting light to the image intensifier module 112. The NV system 100 further includes an eyepiece 122. The eyepiece 122 includes optics for focusing images created by the NV system 100 into the eye of the user.

Figure 1C:
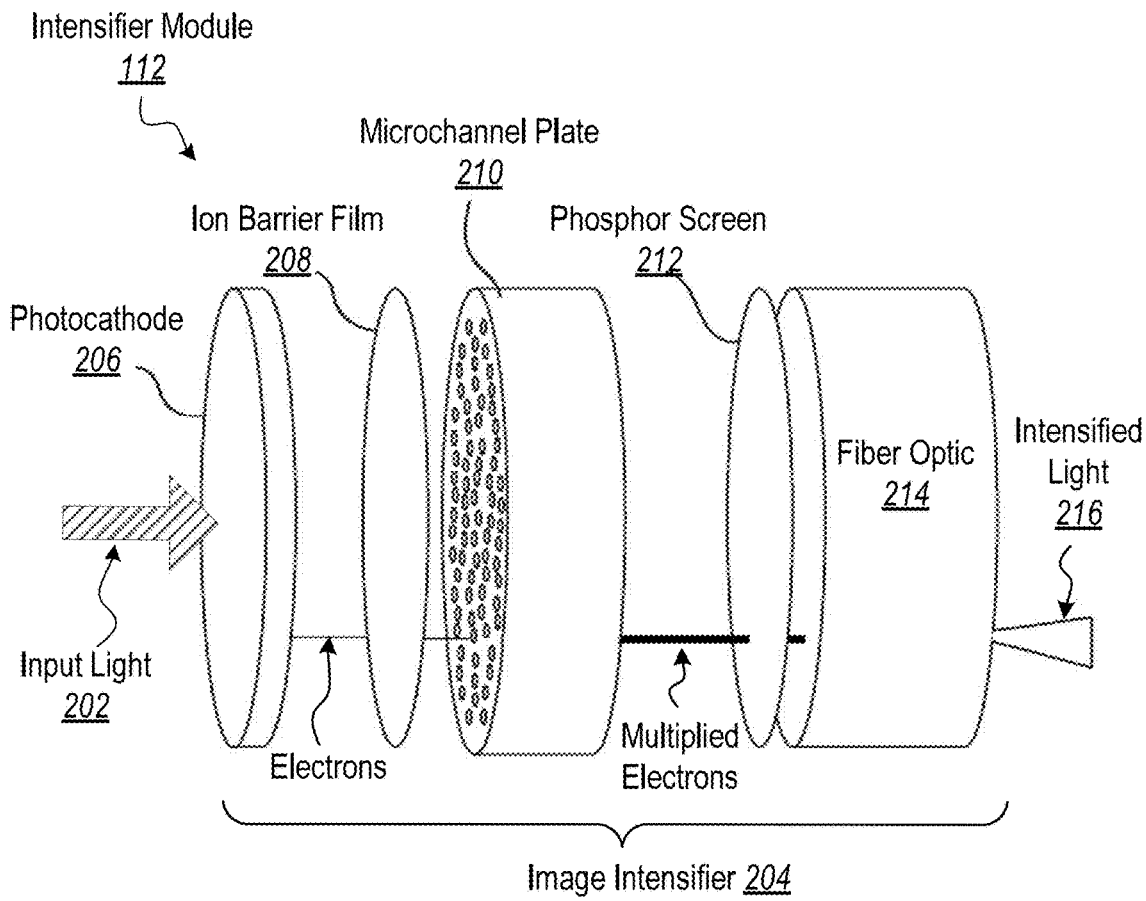
FIG. 1C illustrates a schematic diagram of an intensifier module of the NV system, according to one embodiment.
Figure 1D:
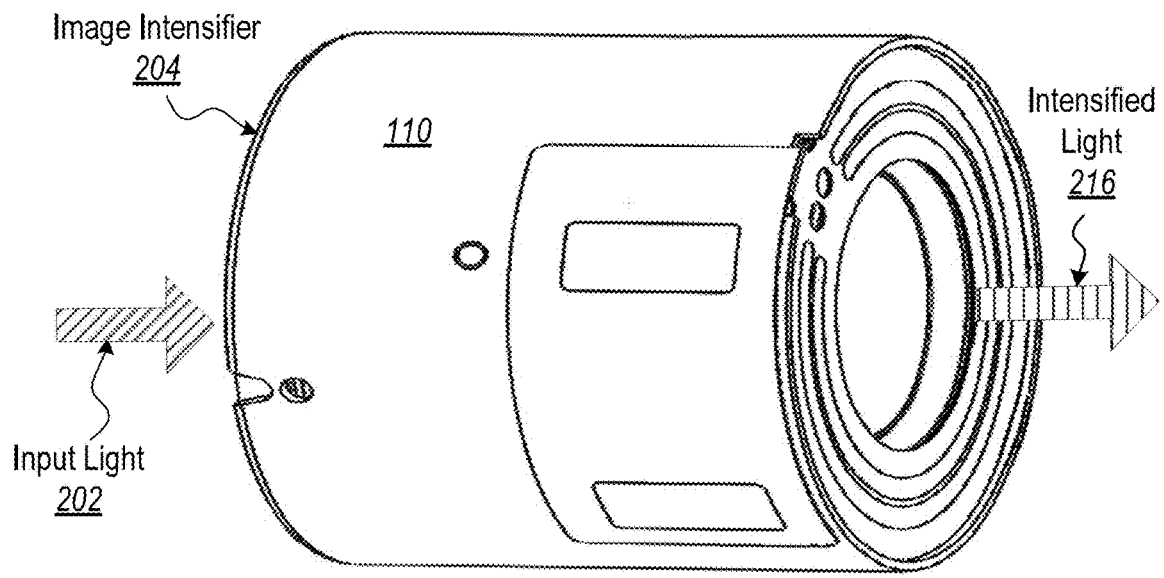
FIG. 1D illustrates a perspective view of an intensifier module of the NV system, according to one embodiment.

FIGS. 1C and 1D illustrate the image intensifier module 112, according to one example. The image intensifier module 112 includes an image intensifier 204 without an overlay display. For example, the illustrated intensifier module 112 in FIGS. 1C and 1D may be the legacy image intensifier that is replaced when upgrading to an improved image intensifier having the overlay display functionality. The light from the image intensifier module 112 is captured by the eyepiece 122 and directed to the user.

The image intensifier module 112 receives the input light 202, which has been transmitted through the objective 102 to the image intensifier module 112. The input light 202 may be, for example, dim light from a nighttime environment that would be challenging if not impossible to see unaided with the naked eye.

The objective directs the input light 202 into the image intensifier 204. The image intensifier 204 may include functionality for amplifying the received image so that the image that can be viewed by the user. In the illustrated embodiment, this amplification is accomplished using a photocathode 206, a microchannel plate 210, and a phosphor screen 212. The photocathode 206 absorbs incident photons and outputs electrons in response. The electrons may pass through an optional ion barrier film 208. Electrons from the photocathode 206 are transmitted to the microchannel plate 210, which multiplies the number of electrons. The multiplied electrons then strike a phosphor screen 212, which absorbs the energy from electrons generating photons in response. The phosphor screen 212 converts the radiant energy of the multiplied electrons to luminescent light via the phenomenon of luminescence. Accordingly, the phosphor screen 212 glows due to electrons from the microchannel plate 210 striking the phosphor screen 212, creating an intensified image that represents the image of the input light 202. A fiber-optic element 214 carries the intensified light 216 (with the intensified image) to the eyepiece 122 of the NV system where it is output to the user.

The size of the intensifier module 112 is restricted by the dimensions of the intensifier housing 110. As shown in FIG. 1D, in certain embodiments, the respective elements of the intensifier module 112 are packaged in a cylinder that can be secured in the intensifier housing 110. To add additional elements and functionality to the intensifier module 112, some of the elements in the intensifier module 112 (as discussed in more detail below) can be shortened to make room for the additional elements without increasing the overall size of the cylindrical packaging, thereby allowing the intensifier module 112 with improved functionality to fit within the dimensions of the intensifier housing 110.

Further modifications may be used to ensure that intensifier module 112 with improved functionality matches the specifications of a legacy intensifier module 112 that is being replaced. For example, a legacy intensifier module 112 may use a spherically curved focal plane that is implemented in image intensifier tubes via a radius curvature on the fiberoptic inverting element at the exit surface. For example, the radius curvature on the fiberoptic inverting element may be provided via grinding and polishing the fiberoptic inverting element. This curved focal plane allows for a lens to be omitted from the eyepiece assembly for reduced size and weight. To replace this legacy intensifier module with a replacement intensifier module 112 having improved functionality, it is preferably that the replacement intensifier module 112 generates light having the same curved focal plane, such that the replacement intensifier module 112 can be used without modification of the eyepiece 122. For example, if the replacement intensifier module 112 has a flat focal plane rather than the same curved focal plane, then the diopter range of the NV system might be adversely affected.

Figure 2A:
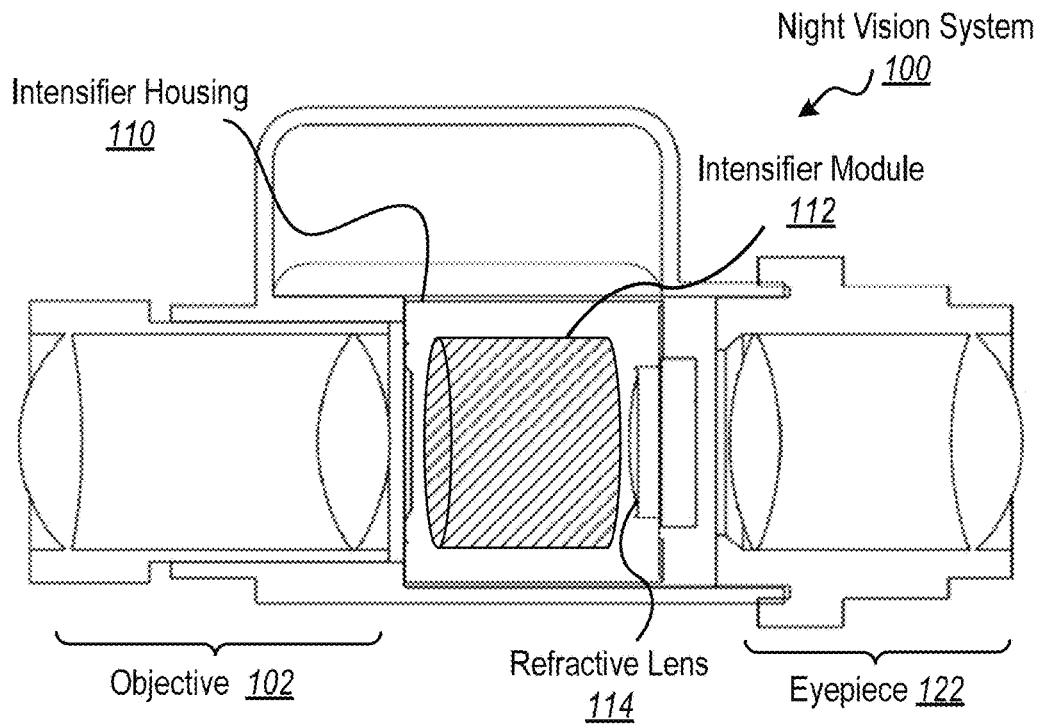
FIG. 2A illustrates a side cutaway view of the NV system having a refractive lens in the intensifier housing, according to one embodiment.
Figure 2B:
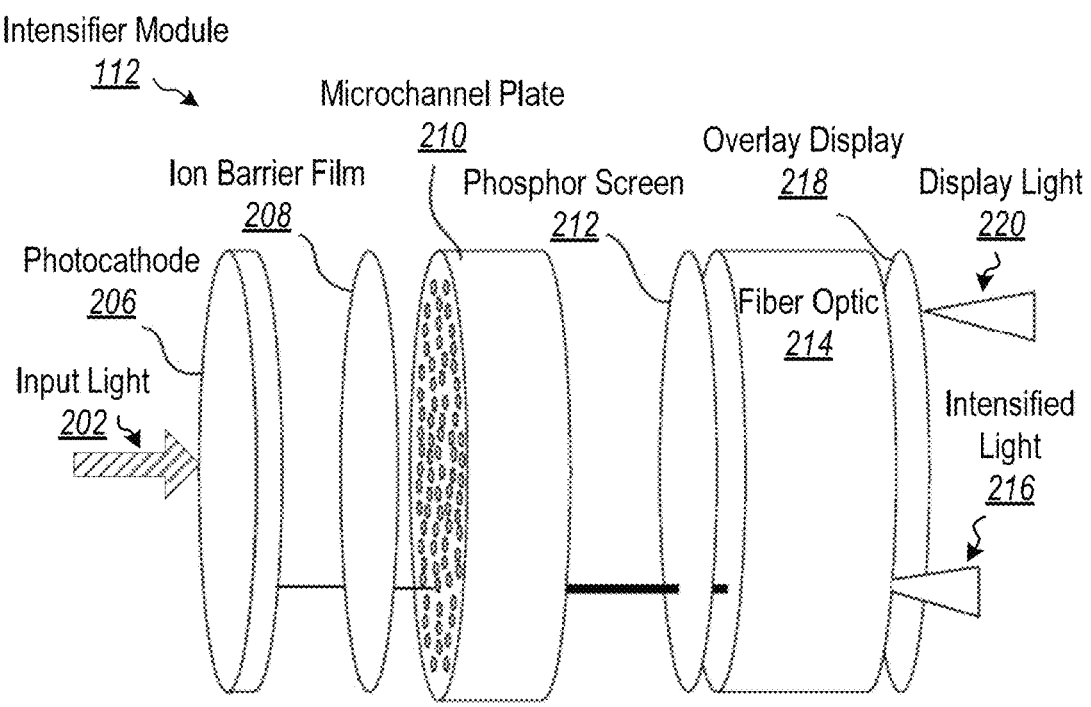
FIG. 2B illustrates a schematic diagram of an intensifier module with an overlay display and without a planar lens, according to one embodiment.
Figure 2C:
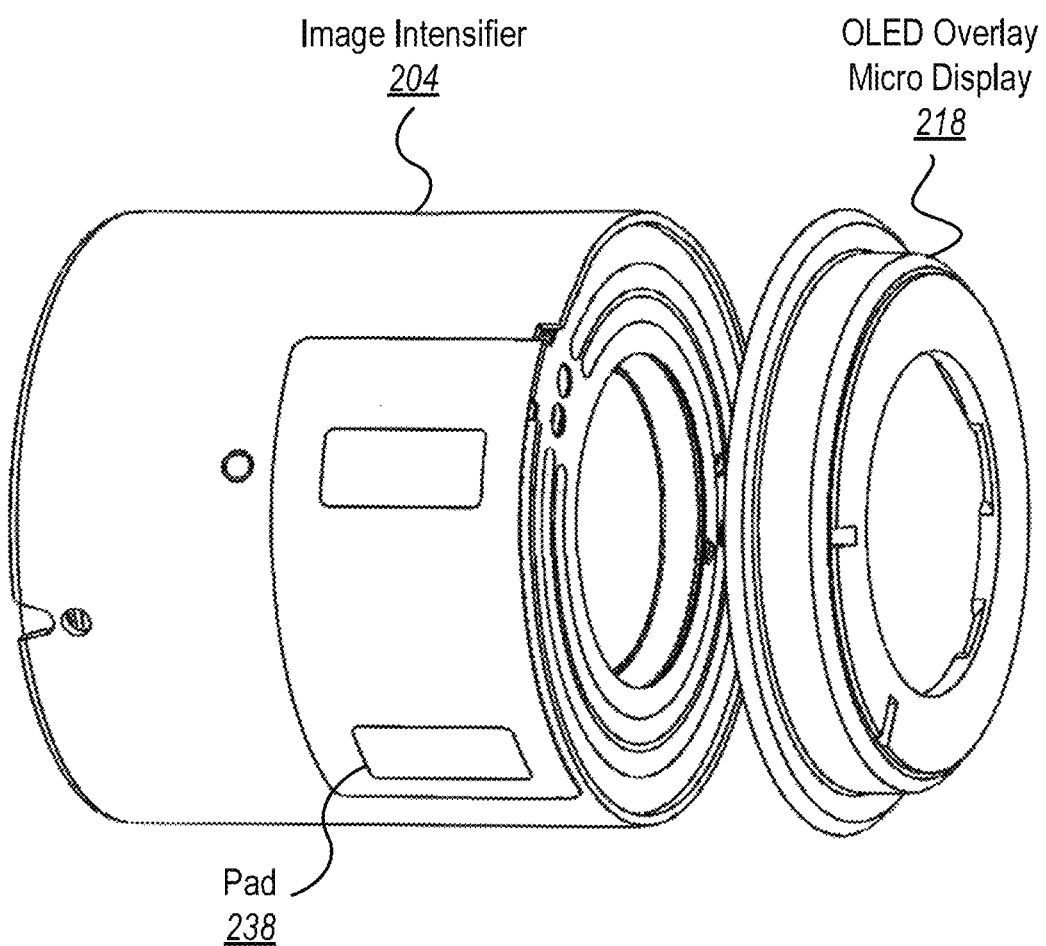
FIG. 2C illustrates a perspective view of an intensifier module with an overlay display, according to one embodiment.

FIGS. 2A-2C illustrate an analog NV system having an intensifier module 112 with an overlay display 218, according to one embodiment. The fiber optic element 214 has a flat exit face, and the overlay display 218 is flat. A refractive lens 114 is provided in the intensifier housing to provide a curved focal plane. Thus, combination of the refractive lens 114 with the intensifier module 112 illustrated in FIGS. 2A-2C may replace the intensifier module 112 illustrated in FIGS. 1B-1D. To avoid redundant descriptions, elements in FIGS. 2A-2C are not repeated for those elements that function the same in FIGS. 2A-2C as in FIGS. 1B-1D.

Figure 8:
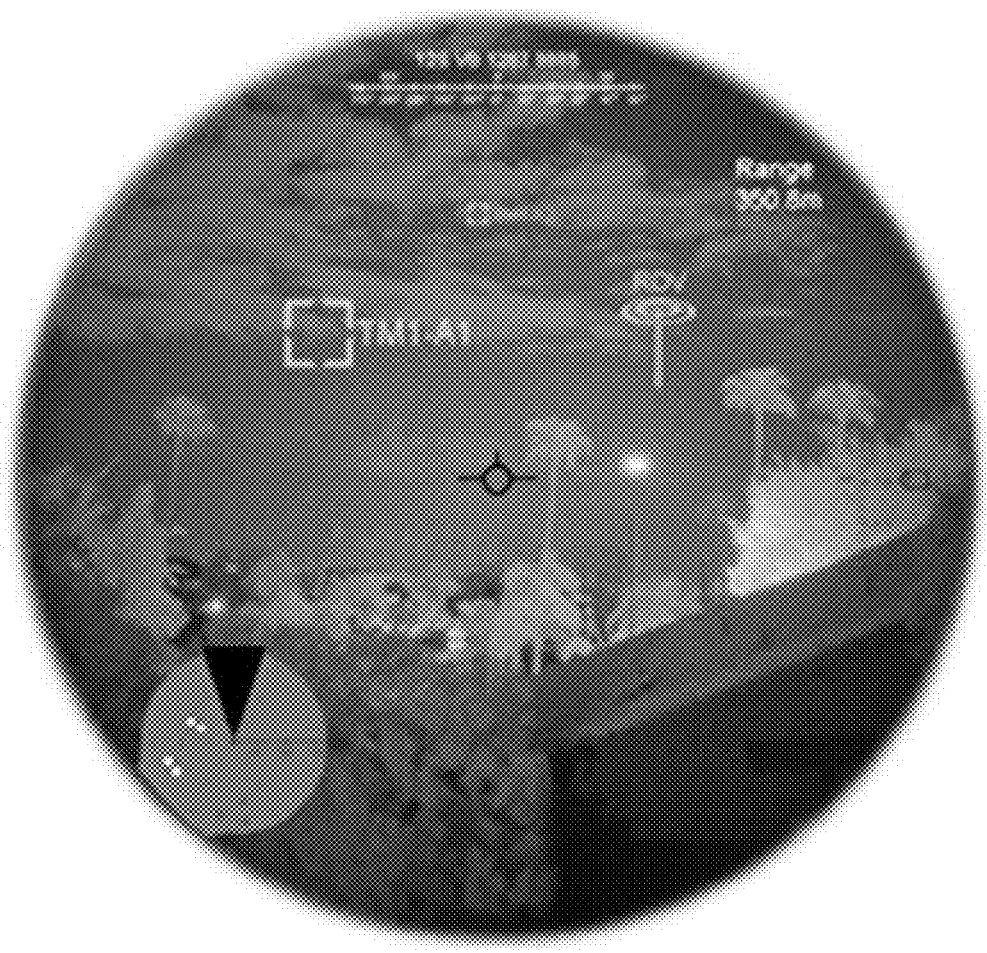
FIG. 8 illustrates an NV scene image with heads-up display functionality, according to one embodiment.

The overlay display 218 generates display light 220, which is superimposed with the intensified light 216. For example, the overlay display 218 may include functionality for displaying information to a user. Such information may include graphical content, including text, images, superimposed thermal image data and the like. FIG. 8, which is discussed below, illustrates an example of an image in which a micro display 218 superimposed text, symbols, and other information over an intensified image that includes trees and clouds. Additional details regarding certain embodiments of the NV system 100 and the overlay display 218 are provided in U.S. patent application Ser. No. 16/868,306, filed on May 6, 2020, titled "Backside Etch Process for Transparent Silicon Oxide Technology", which is incorporated herein by reference in its entirety.

The refractive lens 114 may be a meniscus lens, for example. The refractive lens 114 may be fabricated using a material having a high index of refraction. lens (meniscus or similar) can do the curvature correction. The refractive lens 114 may apply a same phase curvature to the intensified light 216 as would be applied by the curved exit face of the fiber optic element 214 illustrated in FIG. 3C, for example. In certain embodiments, the refractive lens 114 may extend beyond the end of the tube volume housing (i.e., beyond the intensifier housing 110, limiting the diopter range of the eyepiece 122. In certain embodiments, the refractive lens 114 occupies some space in the intensifier housing 110, and consequently, other elements in the intensifier module 112 are made more compact to allow for the occupied by the refractive lens 114. For example, the fiber optic element 214 may be an inverter and can be made shorter by using a faster twist pitch for the fiber optic waveguides performing the inversion. Further, in certain embodiments, the power supply (not shown) may be shortened to accommodate for the space occupied by the refractive lens 114.

Figure 3A:
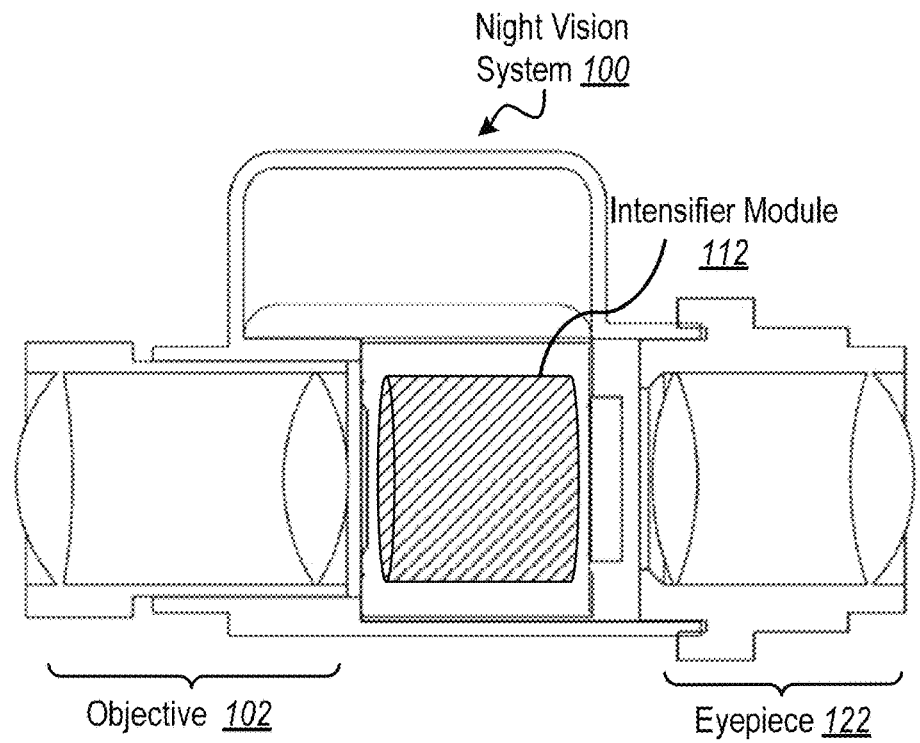
FIG. 3A illustrates a side cutaway view of the NV system without a refractive lens in the intensifier housing, according to one embodiment.
Figure 3B:
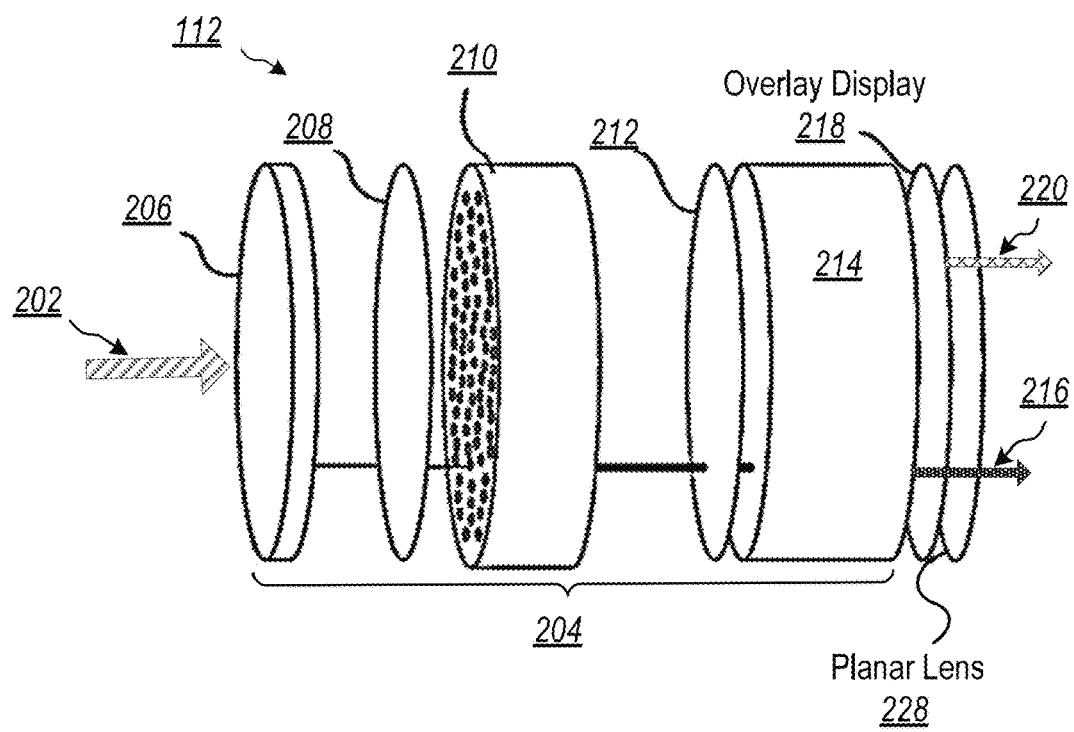
FIG. 3B illustrates a schematic diagram of an intensifier module with an overlay display and with a planar lens, according to one embodiment.
Figure 3C:
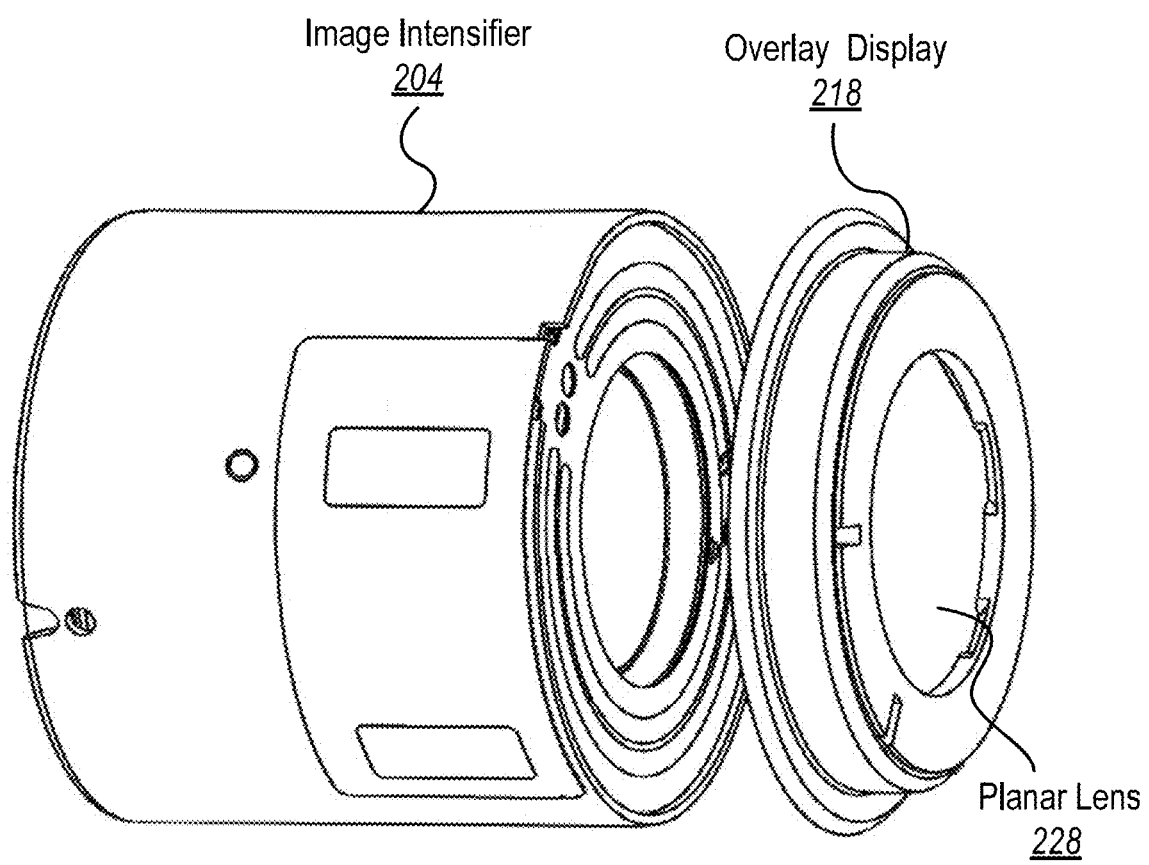
FIG. 3C illustrates a perspective view of an intensifier module with an overlay display and with a planar lens, according to one embodiment.

FIGS. 3A-3C illustrate an analog NV system having an intensifier module 112 with an overlay display 218 and a planar lens 228, according to one embodiment. Again, redundant descriptions are omitted. The fiber optic element 214 has a flat exit face, and the overlay display 218 and planar lens 228 are respectively fabricated on flat substrates. The planar lens 228 induces a phase curvature on the display light 220 and the intensified light 216. The planar lens 228 performs a similar function as the refractive lens 114, except the planar lens 228 can be substantially thinner than the refractive lens 114. Consequently, the size of the other elements in the intensifier module 112 need not be decreased to allow for the space occupied by the planar lens 228 because the space occupied by the planar lens 228 is minimal. For example, the planar lens 228 may prevent violating the diopter range controls, and the planar lens 228 may not require the power supply volume and position to be altered.

In certain embodiments, the planar lens 228 induces a spherical phase curvature. The planar lens 228 may induces a positive phase curvature that causes the light to converge as it propagates from the planar lens 228 towards the eye piece 122.

Figure 4:
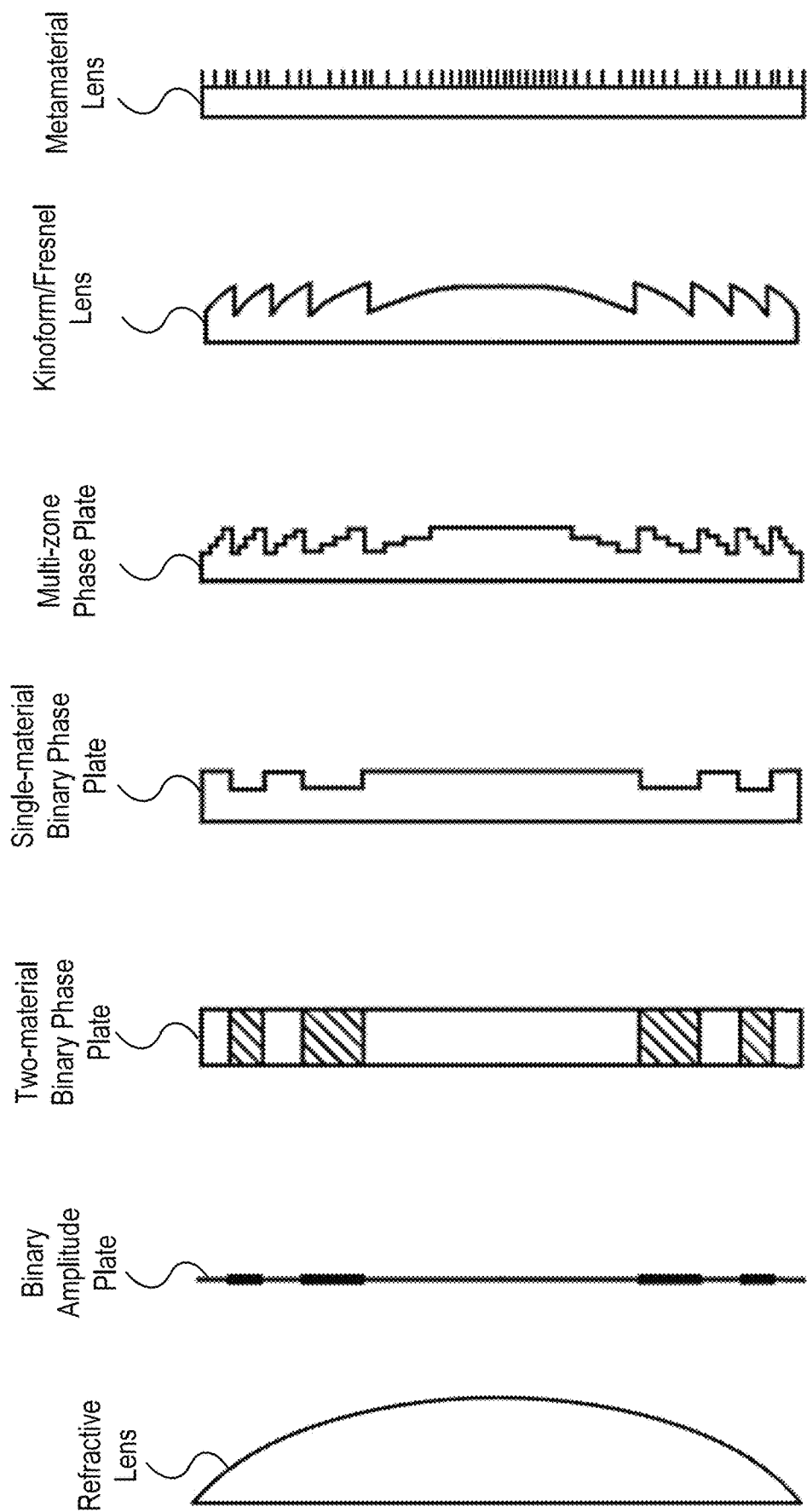
FIG. 4 illustrates a diagram of respective types of lenses.

Preferably, the planar lens 228 will be a metamaterial diffractive lens. FIG. 4 illustrates a refractive lens and several examples of planar, diffractive lenses. The planar lenses are diffractive optical elements and are illustrated by several examples including, e.g., a binary amplitude plate, a two-material binary phase plate, a single-material binary phase plate, a multi-zone phase plate, a kinoform/Fresnel lens, and a metamaterial lens. The binary amplitude plate alternates opaque and transparent regions to achieve a lensing effect. The binary phase plates achieve lensing by alternating regions having a relative 7E-phase shift. The multi-zone phase plate achieves lensing using the same principle as the binary phase plates, except there are more than two types of regions and the discrete phase shifts between zones is more finely divided (e.g., with four zones the relative phase shift will be π/2). The kinoform/Fresnel lens applies a continuum of phase zones with discrete transitions when the phase reaches 2π.

The metamaterial diffractive lens uses nanofabricated structures to realize the desired phase shifts (and/or amplitude variations) with respect to position. The metamaterial diffractive lens may use sub-wavelength structures. For example, the metamaterial diffractive lens may use plasmonic resonant type structures. Alternatively or additionally, the metamaterial diffractive lens may use nanofin structures that are rotated by a systematically increasing angle to achieve the desired phase shift (e.g., in a geometric phase type metamaterial lens or metalens for short). Additionally, the metamaterial diffractive lens may use a propagation phase type metalens in which the phase profile is realizes by modifying the diameters of nanopillars with respect to position. The metamaterial diffractive lens can use any micro or nano fabricated structure or combination thereof to achieve a phase profile that acts as a lens, including those discussed in S.-W. Moon et al., "Recent Progress on Ultrathin Metalenses for Flat Optics," iScience, Volume 23, Issue 12 (2020); and M. K. Chen et al., "Principles, Functions, and Applications of Optical Meta-Lens" Adv. Optical Mater., 2021, 9, 2001414, both of which are incorporated herein by reference in their entirety.

Figure 5A:
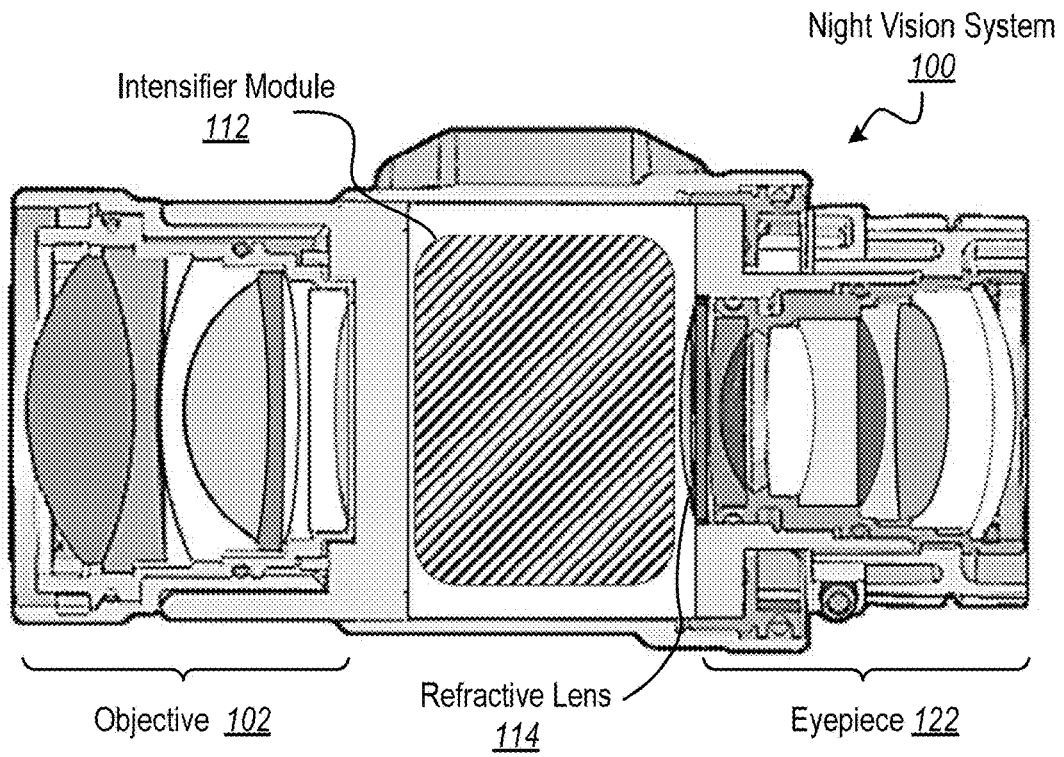
FIG. 5A illustrates a side cutaway view of another embodiment of an NV system having a refractive lens in the intensifier housing, according to one embodiment.
Figure 5B:
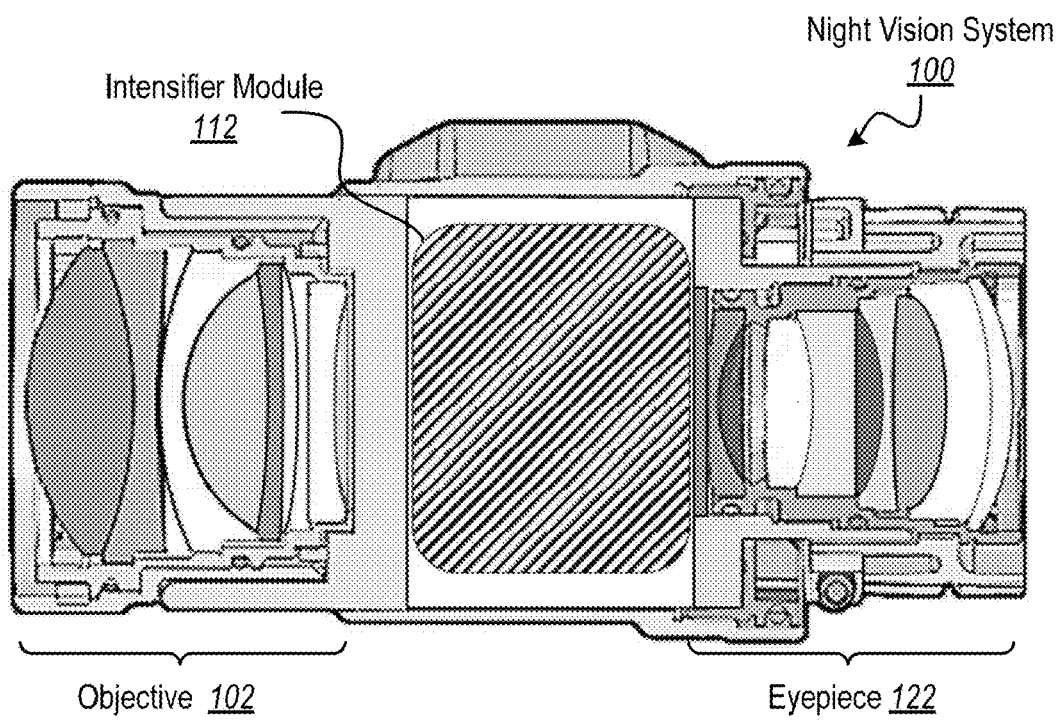
FIG. 5B illustrates a side cutaway view of another embodiment of an NV system without a refractive lens in the intensifier housing, according to one embodiment.

FIGS. 5A and 5B illustrate respective embodiments of the analog NV system 100 in which the intensifier module 112 includes an integrated overlay display 218. In FIG. 5A, the intensifier module 112 is integrated with an overlay display 218, but does not include a planar lens 228. Accordingly, a refractive lens 114 is provided in the intensifier housing 110 after the intensifier module 112. The intensifier module 112 is shortened to allow for the space occupied by the refractive lens 114 in the intensifier housing 110.

In FIG. 5B, the intensifier module 112 is integrated with an overlay display 218, and is integrated with a planar lens 228. Accordingly, a refractive lens 114 is not provided in the intensifier housing 110 after the intensifier module 112. The intensifier module 112 is not shortened because there is no need to allow for space occupied by the refractive lens 114 in the intensifier housing 110.

Figure 6:
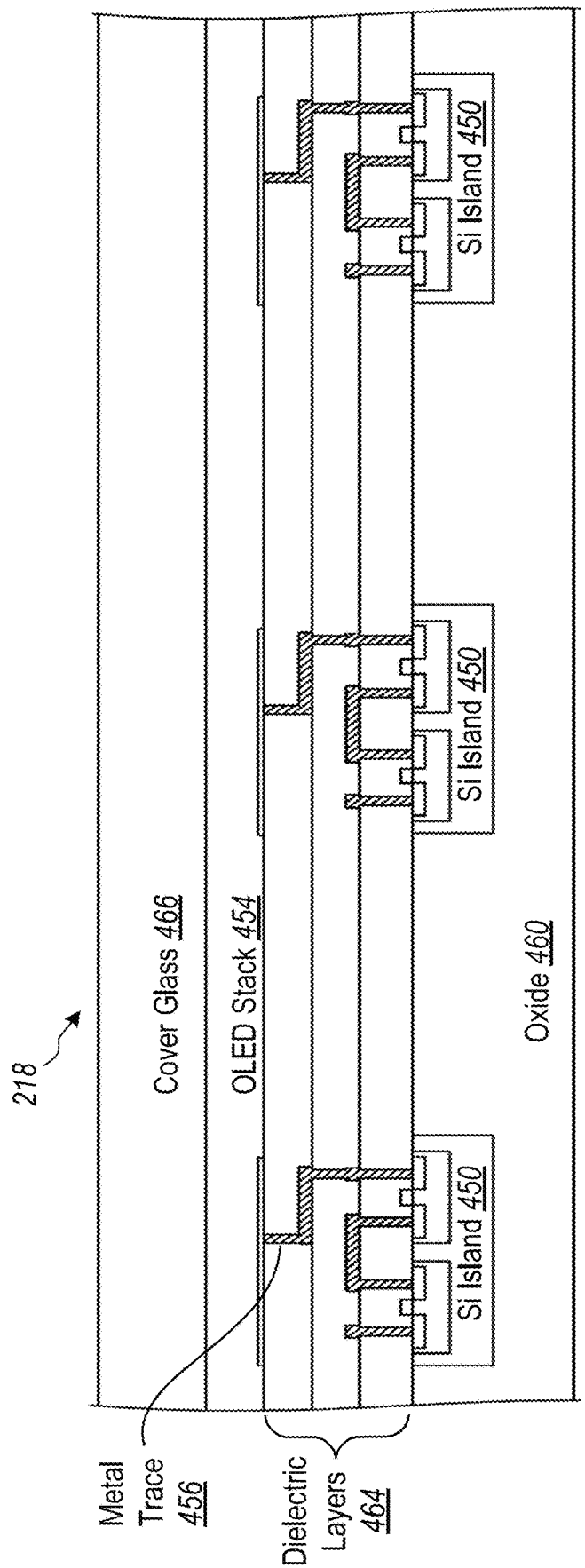
FIG. 6 illustrates a diagram of a portion of an overlay display, according to one embodiment.

Referring now to FIG. 6, in certain non-limiting embodiments, the overlay display 218 may include active silicon areas, which are illustrated as active silicon islands 450 (e.g., native silicon islands). The active silicon islands 450 can be used to fabricate transistors, such as MOSFETs by doping the silicon (Si) with spatially varying concentrations donor and acceptor atoms. Further, the MOSFETs may be fabricated using intermetal and dielectric layers 464 that include insulators (e.g., oxides and dielectrics) and metal traces 456. In certain embodiments, the MOSFETs may provide (but are not limited to providing) logic functions and/or control functions (e.g., to control turning on/off the LEDs in the OLED stack 454).

In the example illustrated in FIG. 6, each of the active silicon islands represents a pixel of the overlay display 218. Thus, by powering various LEDs in the OLED stack 454 using the transistors in the active silicon islands, a display image can be created by the overlay display 218 and output to a user. For example, a display image may be created by outputting the display light 220, as illustrated in FIG. 8, discussed below. In FIG. 6, the intensified light 216 enters the overlay display 218 from the bottom, passes through the oxide 460 and then through the other layers before exiting the overlay display 218 through the cover glass 466. The display light 220 is generated in the OLED and, like the intensified light 216, the display light 220 exits through the cover glass 466. After exiting through the cover glass, both the display light 220 and the intensified light 216 are transmitted to the eyepiece 122 of the NV system 100, and then to the user.

Whereas the pixels (i.e., Si island 450, metal traces 456, and OLEDs in the OLED stack 454) substantially attenuate the intensified light 216, transparent regions between the pixels are at least partially transparent to the intensified light 216. Accordingly, the intensified light 216 is transmitted through the transparent regions between the pixels of the overlay display 218. In contrast, the active Si islands 450 and the metal traces 456 substantial block the intensified light 216.

Figure 7:
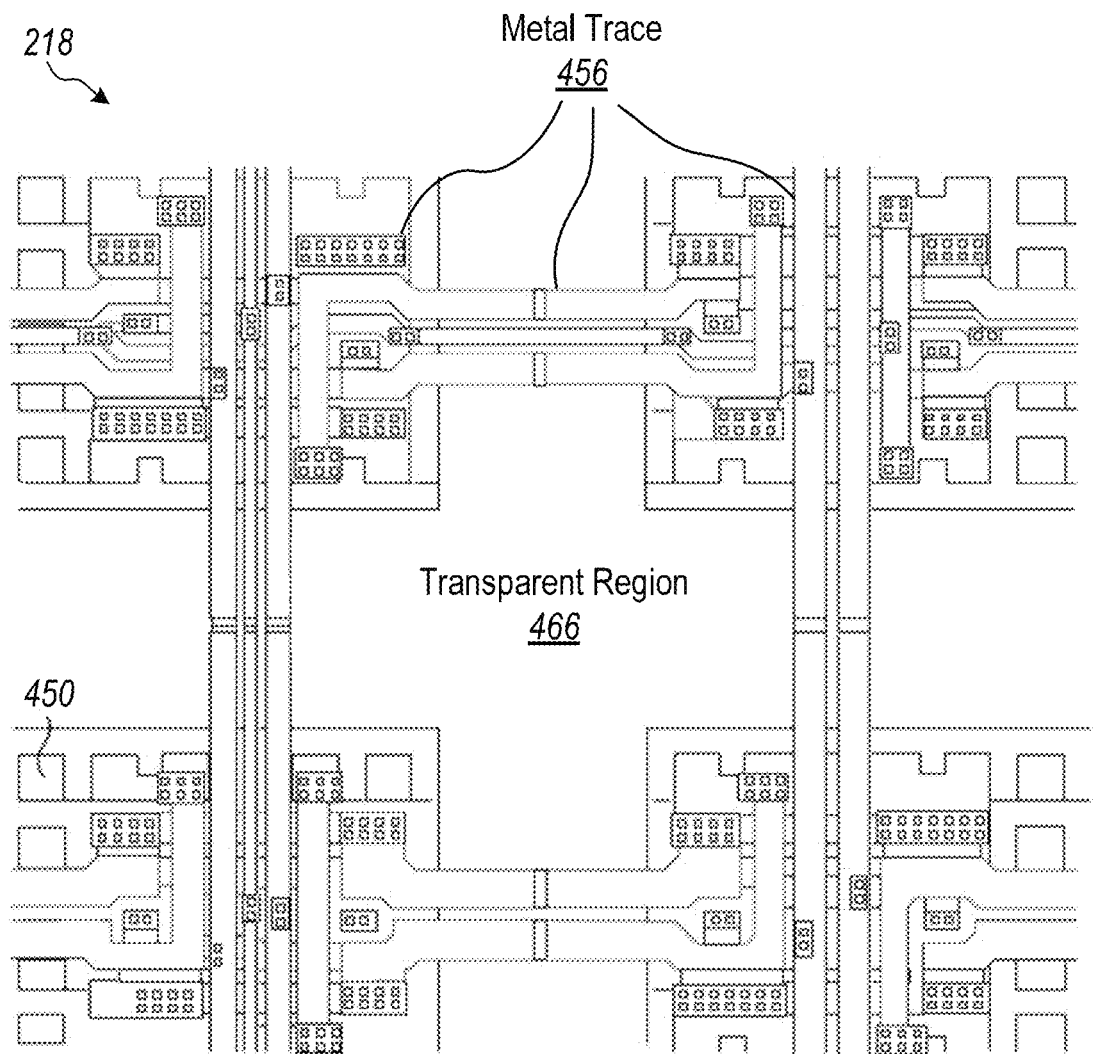
FIG. 7 illustrates a top-down view of a portion of an overlay display, according to one embodiment.

FIG. 7 illustrates a top-down view of a portion of an overlay display 218 in which the opaque regions (e.g., regions including the active Si islands 450 and metal traces 456) are configured with transparent region 466 between the opaque regions. The active Si islands 450 and metal traces 456 may be configured as electronic components (such as MOSFETs) to provide logic functions and to provide control functions for the control of pixels in an overlay display 218. Additionally, the circuitry of the controller logic (i.e., the circuitry determining the relative intensities of the pixels) may also be located in the opaque regions. The active Si islands 450 and metal traces 456 substantially block the intensified light 216, but the intensified light 216 may be transmitted through the transparent region 466 between the Si islands 450 and metal traces 456.

FIG. 8 illustrates an example of an image in which an overlay display 218 superimposes text and other graphical symbols over an amplified image of a nightscape that includes trees and clouds. As discussed above, the overlay display 218 may include functionality for displaying information to a user. Such information may include graphical content, including text, images, superimposed thermal image data and the like. The overlay display 218 outputs display light 220 which can be sent to the eyepiece. Thus, an image such as that illustrated in FIG. 8 is presented to the user in the NV system 100.

In the examples above it should be noted that although not shown various alternatives can be implemented. For example, in any of the embodiments illustrated, a backside fill may be used or may be omitted. Alternatively, or additionally, while the active areas have been shown as being substantially square in nature, it should be appreciated that the active areas may be rectangular or other appropriate shapes.

The discussion above refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical device comprising:
a semiconductor chip having a first surface that receives light and transmits the received light through transparent regions of the optical device,
a plurality of electro-optical circuits formed on the semiconductor chip, including
light emitters configured to output display light, and the transparent regions being arranged between respective light emitters of the light emitters; and
a planar, diffractive lens arranged to induce a phase curvature on the display light and to induce a same phase curvature on the received light as on the display light.

2. The optical device of claim 1, wherein the planar, diffractive lens is a metamaterial diffractive lens.

3. The optical device of claim 1, wherein the planar, diffractive lens is configured to induce a spherical phase curvature on the display light and on the received light.

4. The optical device of claim 1, wherein the planar, diffractive lens induces a positive phase curvature causing display light and the received light to converge.

5. The optical device of claim 1, wherein the semiconductor chip is fabricated on a first planar substrate and the planar, diffractive lens is fabricated on a second planar substrate.

6. The optical device of claim 1, wherein the planar, diffractive lens is fabricated using subwavelength nanofabricated structures that respectively induce phase shifts ranging between 0 and $2\pi$ radians.

7. The optical device of claim 1, further comprising an eye piece configured to receive light having a phase curvature matching the induced phase curvature on the display light and the received light such that both the display light and the received light are in focus.

8. The optical device of claim 1, further comprising a twisted fiberoptic inverter having a flat exit face.

9. The optical device of claim 1, wherein the planar, diffractive lens is one of a Fresnel lens, a multi-zone phase plate, a binary phase plate and a binary amplitude phase plate.

* * * * *